Feb. 22, 1949.   D. S. RENNER   2,462,552
INITIAL ATTENUATOR CONTROL
Filed Jan. 25, 1943
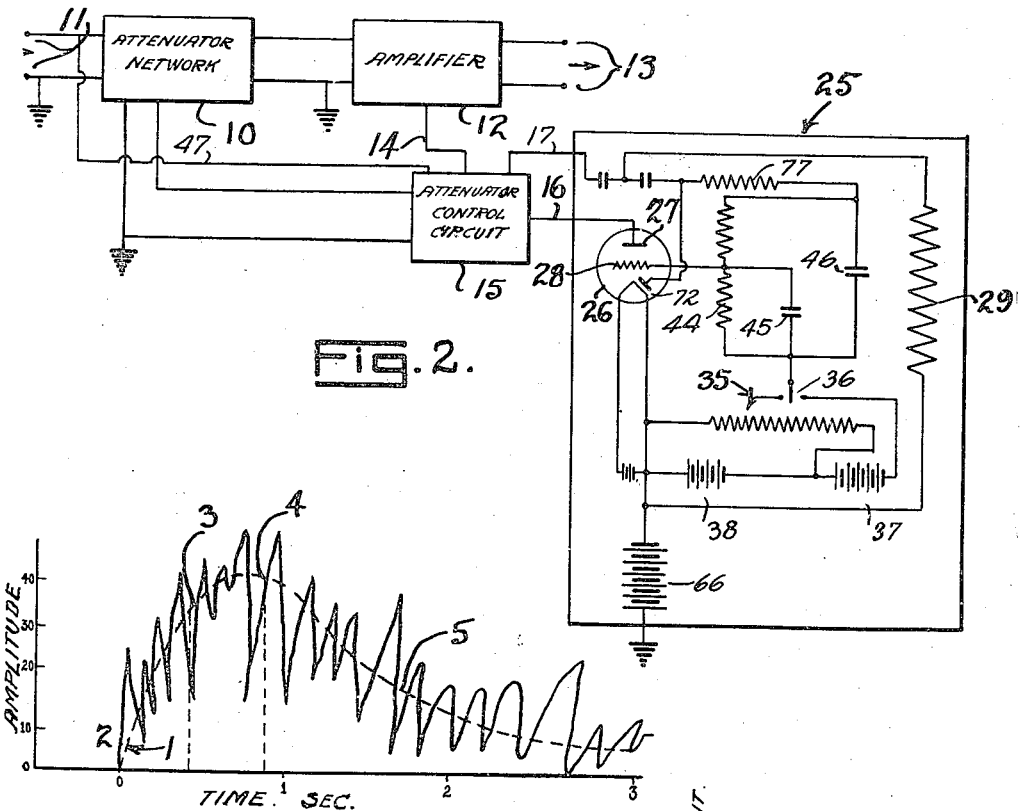
Fig. 2.
Fig. 1.
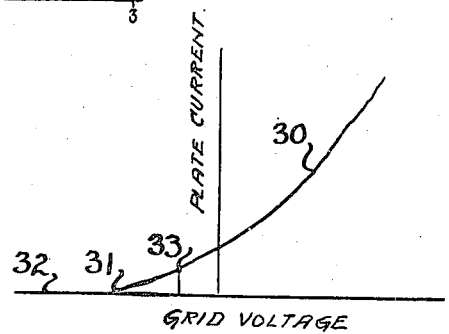
Fig. 4.
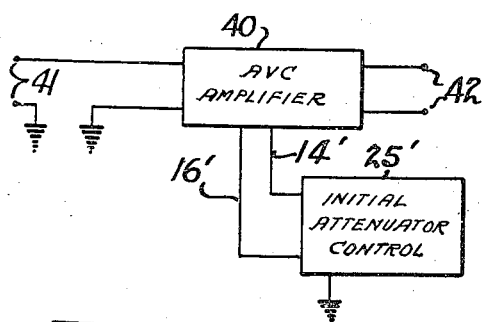
Fig. 3.
INVENTOR.
D. S. RENNER.
BY Lester B. Clark.
ATTORNEY.

Patented Feb. 22, 1949

2,462,552

UNITED STATES PATENT OFFICE 2,462,552

INITIAL ATTENUATOR CONTROL

Darwin S. Renner, Dallas, Tex., assignor to Geophysical Service Incorporated, a corporation of Delaware Application January 25, 1943, Serial No. 473,443

1 Claim. (Cl. 178—44)

This invention relates to gain control in the production of seismic records in the seismic method of geophysical prospecting and more particularly to a system of seismic recording whereby all phases, including the initially arriving waves of a seismic event, are effectively recorded.

In the art of geophysical prospecting by the seismic method, artificially created microseisms are received at preselected points in the earth and are converted into electrical impulses which comprise the input to an amplifier from which the output is utilized to actuate a recorder whereby a graphical record of the seismic event is provided. Such record is utilized to obtain desired information of the location, nature and extent of subsurface formations and particularly those favorable to the presence of valuable deposits such as gas, oil, sulphur, etc.

The seismic waves arriving at the recording station possess a wide range of amplitudes from the extremely high amplitude waves, in the direct and initially arriving energy, to the subsequently arriving waves reflected and refracted by relatively deep formations. Amplitudes of the former are frequently hundreds of times greater than the amplitude of the latter.

As will more fully appear hereinafter, it is important that all phases of the seismic event including the high and the low amplitudes, be recorded with fidelity and at an amplitude that the entire seismic event may be utilized in obtaining desired information.

It is the primary object of the invention to record all phases of a seismic event at a desired amplitude that a maximum of information of geological formations is made available.

Another object is to provide desired gain control and, at the same time, to avoid phase and/or frequency distortion, spurious signals, etc., whereby fidelity in reproduction of the seismic event is maintained.

A further object is to provide a recording system including an initial attenuator control for direct and high amplitude energy in combination with automatic attenuation control for subsequently arriving energy of smaller amplitude.

A more specific object of the invention is to provide a system including initial attenuation control whereby the high amplitude waves initially arriving at the point of observation will be desirably controlled and yet the later arriving waves will be recorded at a desired and controlled gain.

The foregoing are primary objects and will, together with other and further objects, be more fully apparent from the following description taken in connection with the accompanying drawings in which:

Fig. 1 is a graphical illustration of the envelope of the seismic energy arriving at an observation point with the average value indicated by the dotted line.

Fig. 2 is a diagrammatic illustration of that part of the recording mechanism embodying the invention.

Fig. 3 shows an alternative construction utilizing the invention in conjunction with the grid bias type of automatic volume control.

Fig. 4 graphically illustrates the use of bias beyond cut-off for producing desired initial attenuation control.

The production of a desirable seismic record involves difficulties not encountered in other systems requiring some manner of similar gain control. For example, before the seismic event is artificially created, the input energy to the recording system is comparatively small and is usually of a continuous character having its origin in random seismic disturbances. The sensitivity of the system is hence usually adjusted so that this disturbance creates only a small fraction of the normal full output. Some form of automatic gain control is usually used and as the input voltage is increased from zero the output will at first increase substantially in direct proportion. After a certain value of input voltage is reached, the output remains constant and this value of input voltage marks the minimum which will produce full output. The actual value of this input voltage is a measure of the sensitivity of the system with reference to the output power. Such value may be termed the threshold voltage.

As just indicated, the sensitivity of the system is usually, though not necessarily, adjusted until the random disturbance is some observable fraction of the threshold voltage, usually less than one-half. The first impact of signal voltage is very large in comparison to the random seismic disturbance. In general the largest values of signal are at or very near the initial incidence of signal energy, this energy having arrived over the least time path which is among the shorter path lengths and hence has suffered a minimum of attenuation. The rate of incidence of the signal is usually very high while the rate of subsidence is much less. This is clearly shown in Fig. 1 which shows at l the recorded envelope of which ordinates illustrate amplitude and abscissae the time of arrival of the high energy seismic waves. It is to be noted that the initial energy arrived at the instant indicated at 2 and that the rate of incidence to point 3 is relatively large. Thereafter the rate of incidence is materially less until maximum amplitude is reached at the instant indicated as 4. This maximum of amplitude is followed by a smaller rate of subsidence as is shown by the portion 5 of the curve 1.

The rate of incidence between points 2 and 3 is quite comparable to the rate of change of the individual seismic waves. By the time point 3 on the curve is reached, desired gain control action will have taken place and thence automatic gain control regulation will provide the necessary gain control that the remainder of the graphical record will contain a maximum of information. However, the portion of the record between points 2 and 3, being uncontrolled, is useless except for indicating the instant of arrival of the signal energy at point 2. Not only does the appearance of the record suffer from the lack of control in the interval 2 to 3, but desired information may be obscured in this interval. The invention contemplates a system capable of proper control of the initially arriving energy as well as that comprising later portions of the seismic event and this is accomplished without producing any undesirable effect upon any portion of the record. Hence, as already indicated, the invention serves to effect desired control of all phases of the seismic event.

My prior copending application, Serial No. 464,607 filed Nov. 5, 1942, for Amplitude control, broadly comprehends the instant invention and the present application constitutes a continuation-in-part of the earlier application. Such earlier application discloses the embodiment shown in Fig. 2 which comprises a thermally controlled attenuator network 10 to which the seismic input signal is supplied through terminals 11. The output of the attenuator network 10 is supplied to amplifier 12 which, in turn, supplies energy through terminals 13 to the recording mechanism.

Control of the attenuator network 10 is effected through a potential tap at some point in the signal channel, such as a point in the amplifier 12. Conductor 14 leads from such tap point to the attenuator control circuit 15 which supplies desired control currents to the attenuator network 10. Preferably the attenuator network 10 and the control network 15 are constructed and operate in accordance with the disclosure in my above identified application. It is to be understood however, that these units may comprise any suitable attenuating means and attenuating control means of which the latter is responsive to control currents supplied thereto.

The initial attenuator circuit 25 comprises a vacuum tube circuit including tube 26 of which the plate 27 is connected to attenuator control circuit 15 through the conductor 16.

The grid 28 of tube 26 is normally biased in such manner that the plate current has a value to cause the attenuator 10 to assume a value of attenuation which is judged proper for the conditions of shot point-pickup point distance, explosive sizes, etc. A little experience soon enables the operator to closely estimate the corresponding setting of potentiometer 35. This determines the position of points 33 (Fig. 4) and hence the value of plate current from tube 26. This plate current is fed into the same network as receives the rectified signal D. C. in the nominal control of the record and is utilized to supplement the control currents to effect initial attenuation control as more fully explained hereinafter. The control current in this network (embodied in 15) causes proportional control of the attenuation of 10. Thus the initial attenuation is set before the seismic event takes place.

As above explained conductor 14 leads from a tap point in the signal channel in the amplifier 12 to provide a control potential within the control circuit 15 whereby desired control currents are supplied to the attenuator network 10. This control potential is obviously initiated by incidence of the seismic event and is supplied to the conductor 17 to the initial attenuation control circuit 25. The resulting potential across the diode in the tube 26 causes a rectified direct current across the resistor 44 connected to grid 28 which becomes biased to a point such as 32 (Fig. 4). This removes the plate current of 26 as a factor in the control of the attenuation. While the resulting direct voltage in the control circuit is decaying for this reason, it is being built up from the rectified signal so that proper control is effective from the instant 2 in Fig. 1. Due to the condensers 45 and 46 and the drive from 14, the bias on grid 28 does not reach point 31 (Fig. 4) until the seismic event has passed. Shortly thereafter it returns to original point 33 and is in position for the next seismic event.

Connection between the resistor-condenser combination 44, 45, 46, 76 and the potentiometer 35 is through the manually operable switch 36 which may also be thrown to the opposite terminal whereby the potential of battery 37 is added to that of battery 28 to place an increased bias on the grid 28 beyond cut-off. This renders the initial attenuator inoperative and permits the operator to voluntarily observe whatever signals are present either before or after the vibratory event.

To be certain of the release of the initial attenuation, sometimes part of the signal from conductor 47, ahead of attenuator network 10, is transferred to conductor 14. This is useful in case the initial attenuation is erroneously set so high as to essentially prevent signal from reaching amplifier 12.

The attenuator network 10 may be, and preferably is, resistive with some of the resistors being filamentary and so arranged that attenuation decreases as they are heated. The oscillator unit is so constructed that it supplies heating power in inverse proportion to the direct current input from the initial attenuator control circuit 25. Thus, when voltage from the circuit 25 increases, the oscillator output decreases and the attenuation increases as the control voltage increases. This direct current may comprise the plate current of tube 26 as heretofore explained. The initial attenuation is the result of the plate current as determined by the control 35 which, as already explained, may be readily determined from limited experience of the operator. Tube 26 cuts off this plate current, when seismic signals appear, through rectification in the diode 72 of tube 26.

The composite direct voltage in the control circuit referred to does not in system Fig. 2 directly control the attenuation, but in instances of tube bias, such is the case. Such a system is shown in Fig. 3. Here the D. C. voltage in the control circuit directly biases the tube stages in amplifier 49. The control due to the initial attenuation control circuit 25 obviously has an exactly similar effect and use. This is to illustrate that the idea can be applied to any system of automatic control.

While the foregoing disclosure of my invention has shown the potential tap as located within the amplifier 12 or 40, it is to be understood that such tap may be had at any desired point in the signal channel. Alternately, if desired, the control potential may be a composite potential derived from the use of a plurality of taps in the signal channel.

If it is wished to divorce the initial attenuation control from the action of the signal in removing it as the seismic event begins, a relay may be used in the plate circuit of tube 26 to break the control current, now regulated by a simple potentiometer or such, which would flow through its contacts.

Broadly the invention comprehends a seismic recording system which functions in a manner that both the high and low energy portions of the seismic waves arriving at the point of observation are recorded at a desired amplitude and with such fidelity that a maximum of information may be derived from the seismic record.

What is claimed is:

A seismic recording system comprising in combination, a signal channel, volume control means in said channel, initial attenuator control means operatively connected to said channel and control means for modifying the operation of said first mentioned means during the initial period of arrival of high amplitude input energy to the channel, said attenuator control means comprising a thermionic tube and means manually operable to preselect a plate current therethrough for modifying the operation of the volume control means, and means operable by a signal in the signal channel to bias the tube beyond cut off during the period of arrival of low amplitude input energy to the channel.

DARWIN S. RENNER.

REFERENCES CITED

The following references are of record in the file of this patent:

UNITED STATES PATENTS

| Number | Name | Date |
| --- | --- | --- |
| 2,035,263 | Cushman et al. | Mar. 24, 1936 |
| 2,137,020 | Luck | Nov. 15, 1938 |
| 2,143,056 | Curtis | Jan. 10, 1939 |
| 2,245,353 | Morlock | June 10, 1941 |
| 2,286,106 | Fritzmann | June 9, 1942 |
| 2,295,410 | Kreuzer | Sept. 8, 1942 |
| 2,329,570 | Wellenstein et al. | Sept. 14, 1943 |
| 2,352,825 | Fay | July 4, 1944 |
| 2,354,420 | Minton | July 25, 1944 |